United States Patent
Chiang

(10) Patent No.: US 7,431,580 B2
(45) Date of Patent: Oct. 7, 2008

(54) MOLD FOR FORMING WORKPIECE

(75) Inventor: Tsung-Wei Chiang, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/309,859

(22) Filed: Oct. 13, 2006

(65) Prior Publication Data

US 2007/0190204 A1 Aug. 16, 2007

(51) Int. Cl.
*B29C 33/30* (2006.01)

(52) U.S. Cl. .................. 425/190; 425/577; 425/468; 425/556; 425/443; 425/441

(58) Field of Classification Search .............. 425/125, 425/192 R, 193, 195, 344, 351, 352, 394, 425/400, 406, 443, 451.2, 80, 59, 95, 155, 425/160, 212, 190, 577, 468, 556, 441; 248/59, 248/95, 155, 160, 212
See application file for complete search history.

(56) References Cited

U.S. PATENT DOCUMENTS

| | | | | |
|---|---|---|---|---|
| 2,266,169 A * | 12/1941 | Crumrine | .................. | 249/95 |
| 2,304,984 A * | 12/1942 | Woos | .................. | 264/275 |
| 2,409,142 A * | 10/1946 | McCoy | .................. | 425/165 |
| 2,532,501 A * | 12/1950 | Johnson | .................. | 264/40.5 |
| 2,559,860 A * | 7/1951 | Fay | .................. | 425/125 |
| 2,813,300 A * | 11/1957 | Hausman | .................. | 425/192 R |
| 3,481,000 A * | 12/1969 | Barfuss | .................. | 425/406 |
| 3,593,366 A * | 7/1971 | Smith | .................. | 425/78 |
| 3,971,841 A * | 7/1976 | Rubinstein | .................. | 264/275 |
| 4,137,962 A * | 2/1979 | Pol | .................. | 164/236 |
| 4,162,138 A * | 7/1979 | Byrne | .................. | 425/125 |
| 4,254,933 A * | 3/1981 | Netto | .................. | 249/103 |
| 4,384,702 A * | 5/1983 | Boskovic | .................. | 249/103 |
| 4,427,352 A * | 1/1984 | DeSantis et al. | .................. | 425/78 |
| 4,435,147 A * | 3/1984 | Myers et al. | .................. | 425/577 |
| 4,456,445 A * | 6/1984 | DeSantis et al. | .................. | 425/78 |
| 4,708,314 A * | 11/1987 | Kuhling | .................. | 249/103 |
| 4,752,204 A * | 6/1988 | Kataoka | .................. | 425/384 |
| 4,790,738 A * | 12/1988 | Shimojo et al. | .................. | 425/192 R |
| 4,790,739 A * | 12/1988 | Manfredi | .................. | 425/192 R |
| 4,933,119 A * | 6/1990 | Weymouth, Jr. | .................. | 264/1.1 |
| 4,979,720 A * | 12/1990 | Robinson | .................. | 249/103 |
| 5,186,953 A * | 2/1993 | Minaudo | .................. | 425/47 |
| 5,259,742 A * | 11/1993 | Ichikawa et al. | .................. | 425/47 |
| 5,288,222 A * | 2/1994 | Wieser | .................. | 425/190 |
| 5,295,804 A * | 3/1994 | Dinnan | .................. | 425/182 |

(Continued)

*Primary Examiner*—Steven P. Griffin
*Assistant Examiner*—Seyed Masoud Malekzadeh

(57) ABSTRACT

An exemplary mold for forming a workpiece includes a first core holer, a first core member, a second core holer, a second core member, a mounting member, and an adjusting member. The first core member is mounted in the first core holer, the second core holer is configured for attachment to the first core holer, the second core member is mounted in the second core holer, the first core member and the second core member are configured for cooperatively defining a mold chamber. The mounting member is coupled to the first core holer, the adjusting member has a threaded portion in threaded engagement with the mounting member and a distal portion coupled to the first core member, the adjusting member is configured for adjustably moving the first core member relative to the second core member, thus adjusting a size of the mold chamber.

9 Claims, 2 Drawing Sheets

U.S. PATENT DOCUMENTS

| | | | |
|---|---|---|---|
| 5,344,600 A * | 9/1994 | McShane et al. | 264/219 |
| 5,399,223 A * | 3/1995 | Vogt | 156/285 |
| 5,482,451 A * | 1/1996 | Johnson et al. | 425/116 |
| 5,484,274 A * | 1/1996 | Neu | 425/116 |
| 5,620,716 A * | 4/1997 | Opitz | 425/169 |
| 5,773,041 A * | 6/1998 | Singh et al. | 425/195 |
| 5,776,518 A * | 7/1998 | Wohlgemuth | 425/182 |
| 5,788,872 A * | 8/1998 | Uratani | 249/103 |
| 5,902,512 A * | 5/1999 | Streit | 249/103 |
| 5,968,564 A * | 10/1999 | Welsh et al. | 425/577 |
| 5,993,090 A * | 11/1999 | Straka et al. | 400/134.4 |
| 6,149,420 A * | 11/2000 | Kim et al. | 425/192 R |
| 6,277,308 B1 * | 8/2001 | Kiernicki et al. | 264/1.25 |
| 6,284,160 B1 * | 9/2001 | Kiernicki et al. | 264/1.25 |
| 6,308,929 B1 * | 10/2001 | Wieder | 249/103 |
| 6,499,986 B1 * | 12/2002 | Saito | 425/190 |
| 6,527,536 B2 * | 3/2003 | Okubo et al. | 425/190 |
| 6,663,371 B2 * | 12/2003 | Curl | 425/12 |
| 6,749,416 B2 * | 6/2004 | Arndt et al. | 425/193 |
| 6,872,069 B2 * | 3/2005 | Starkey | 425/556 |
| 6,966,257 B2 * | 11/2005 | Uratani | 101/4 |
| 7,052,264 B2 * | 5/2006 | Sudo et al. | 425/188 |
| 7,131,625 B2 * | 11/2006 | Wieder | 249/103 |
| 7,131,834 B2 * | 11/2006 | Babin et al. | 425/564 |
| 7,258,529 B2 * | 8/2007 | Wagner | 425/192 R |
| 7,258,539 B2 * | 8/2007 | Lowe et al. | 425/192 R |
| 2003/0008034 A1 | 1/2003 | Niewels | |
| 2003/0141616 A1 * | 7/2003 | Coel et al. | 264/40.5 |
| 2004/0101588 A1 * | 5/2004 | Coel et al. | 425/468 |
| 2004/0161489 A1 * | 8/2004 | Hwang et al. | 425/556 |
| 2005/0042322 A1 * | 2/2005 | Takao | 425/443 |

* cited by examiner

MOLD FOR FORMING WORKPIECE

CROSS-REFERENCE TO RELATED APPLICATIONS

This application is related to commonly-assigned co-pending applications entitled, "MOLD FOR FORMING OPTICAL LENS AND METHOD FOR MANUFACTURING SUCH MOLD", filed on Mar 8, 2006 (U.S. application Ser. No. 11/308128), "METHOD FOR MANUFACTURING A MOLD CORE", filed on Jun. 28, 2006 (U.S. application Ser. No. 11/478414), and "MOLD AND MOLD RELEASING METHOD OF THE SAME", filed on Jul. 17, 2006 (U.S. application Ser. No. 11/458079). Disclosures of the above identified applications are incorporated herein by reference.

TECHNICAL FIELD

The present invention relates generally to molds, and more particularly, to an adjustable mold for forming a workpiece.

With the development of industry, molding processes are widely used for manufacturing workpieces, for example, optical articles such as lenses and light guide plates. Such workpieces are needed to satisfy oft-conflicting requirements of compactness, low cost, and excellent quality.

In a molding process of the related art, the molding process utilizes a mold for forming a workpiece. The mold typically includes a first mold part and a second mold part, the first mold part and the second mold part each may have a core member. Both of the core members have a molding surface conforming to a surface of the workpiece. When the first mold part and the second mold part are brought together, a mold chamber according to a size of the workpiece is defined between the two molding surfaces of the core members.

Generally, when the size such as a thickness of the workpiece requires an adjustment, the whole mold needs to be changed for another one, or to be disassembled and then modified. However, such alteration, disassembly, and modification may lead to higher costs, and lead to problems for the mold such as abrasion and a loss of concentricity, as a result, a service life of the mold is shortened and a quality of the workpiece formed using such a mold is reduced also.

What is needed, therefore, is an adjustable mold for forming a workpiece.

SUMMARY

In a preferred embodiment, an exemplary mold for forming a workpiece includes a first core holder, a first core member, a second core holder, a second core member, a mounting member, and an adjusting member. The first core member is mounted in the first core holder, the second core holder is configured (i.e., structured and arranged) for attachment to the first core holder, the second core member is mounted in the second core holder, the first core member and the second core member are configured for cooperatively defining a mold chamber. The mounting member is coupled to the first core holder, the adjusting member has a threaded portion in threaded engagement with the mounting member and a distal portion coupled to the first core member, the adjusting member is configured for adjustably moving the first core member relative to the second core member, thus adjusting a size of the mold chamber.

Other objects, advantages and novel features of the invention will become more apparent from the following detailed description when taken in conjunction with the accompanying drawings.

BRIEF DESCRIPTION OF THE DRAWINGS

Many aspects of the mold for forming a workpiece can be better understood with reference to the following drawings. The components in the drawing are not necessarily drawn to scale, the emphasis instead being placed upon clearly illustrating the principles of the present mold. Moreover, in the drawings, like reference numerals designate corresponding parts throughout the several views.

DETAILED DESCRIPTION OF THE PREFERRED EMBODIMENTS

Embodiments of the present mold for forming a workpiece will now be described in detail below and with reference to the drawings.

Figure 1:
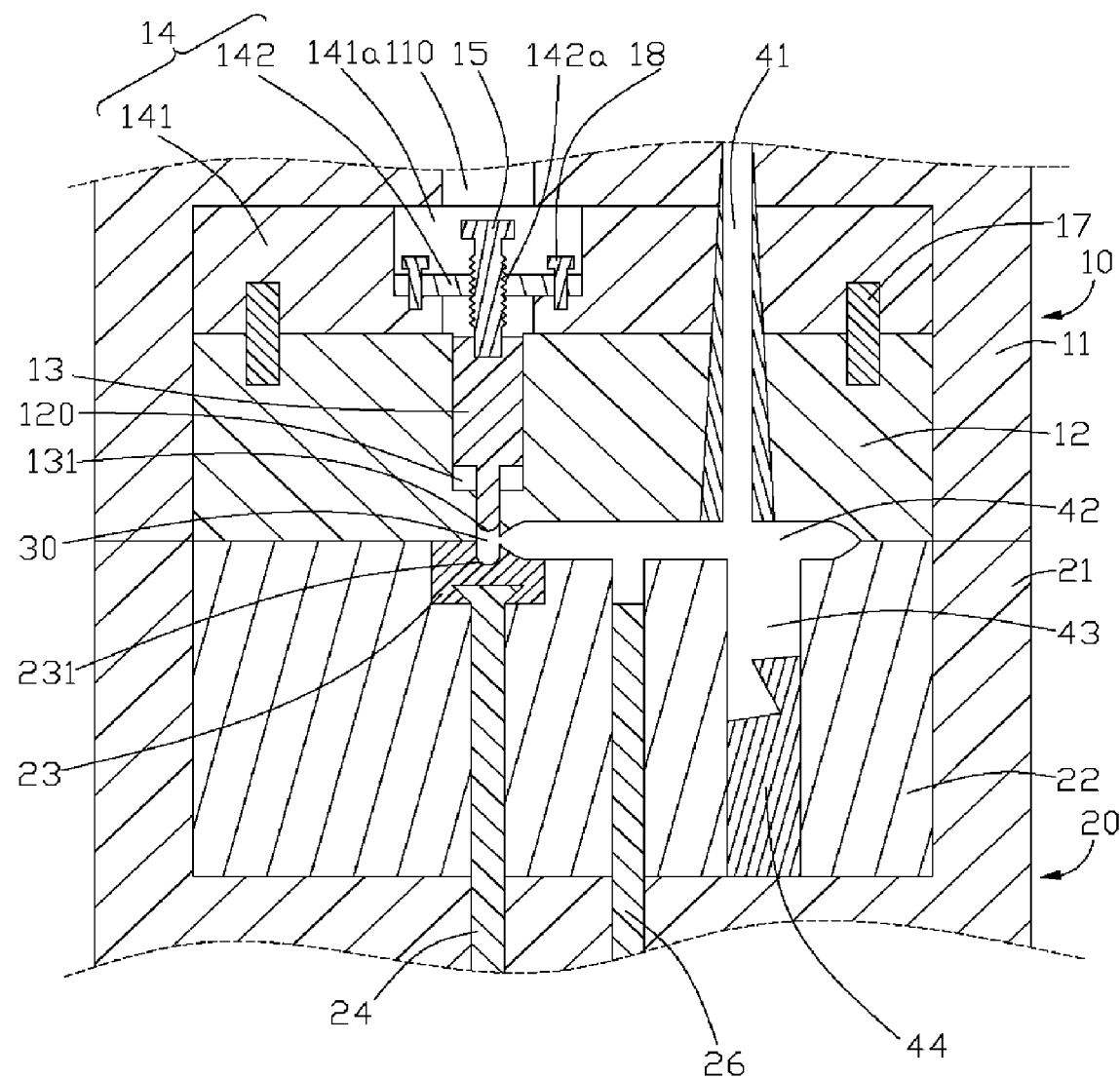
FIG. 1 is a schematic view of a mold for forming a workpiece according to a first preferred embodiment.

Referring to FIG. 1, an exemplary mold 1 according to a first preferred embodiment includes a first mold part 10, and a second mold part 20 opposite to the first mold part 10.

The first mold part 10 includes a mold base 11, a core holder 12, a core member 13, a mounting member 14 and an adjusting member 15. The core holder 12 includes a cavity 120 defined therethrough, the core member 13, which can be a member such as an insert, has a molding surface 121, and is rotatably received in the cavity 120. The mounting member 14 includes a supporting plate portion 141 and a holding plate portion 142. The supporting plate portion 141 defines an opening 141a therein, and is received in the mold base 11 and coupled to the core holder 12 by a number of dowel pins 17. The holding plate portion 142 defines a threaded hole 142a therein, and is secured within the opening 141a by a number of screws 18. The threaded hole 142a is co-axially aligned with the cavity 120. The adjusting member 15, for example, an adjusting screw includes a threaded portion and a distal portion. The threaded portion of the adjusting member 15 is threadedly engaged in the threaded hole 142a , the distal portion of the adjusting member 15 is coupled to the core member 13. Preferably, the mold base 11 includes an opening 110 defined therein and aligned with the opening 141a of the supporting plate portion 141, so that a tool (not shown) can pass through the opening 110 and rotate the adjusting member 15 directly.

The second mold part 20 includes a mold base 21, a core holder 22, and a core member 23. The core holder 22 is mounted in the mold base 21. The core member 23 has a molding surface 231, and is mounted in the core holder 22. The core member 23 can be an ejector block, which is coupled to an ejector pin 24. The ejector pin 24 is configured for assisting the core member 23 to eject the workpiece when finally formed.

The molding surfaces 121, 231 are shaped according to a pair of surfaces of the workpiece, and can be of shapes such as a spherical, an aspherical or a flat. When the first mold part 10 and the second mold part 20 are brought together, the molding surfaces 121, 231 are oriented so as to oppose each other, and a mod chamber 30 according to a size of the workpiece is defined between the first molding surface 121 and the second molding surface 231.

The mold 1 further includes a sprue 41, a runner 42, a cold slug well 43 and a puller pin 44. The sprue 41 passes trough the first mold part 10, and is used for introducing a material from a feeding device (not shown). The runner 42 is composed of two grooves defined one on each of the surfaces facing towards each other of the core holder 12 and the core holder 22, and provides a passage for the material introduced by the sprue 41 to flow into the mold chamber 30. The cold slug well 43 is placed in the core holder 22, and connects to the runner 42. The cold slug well 43 provides a reservoir to receive cold material from the sprue 41, thus preventing the cold material from entering the mold chamber 30. The puller pin 44 is located below the cold slug well 43, and is used for pulling out the material retained in the sprue 41 when the workpiece has been finally formed and the first mold part 10 and the second mold part 20 is being opened, thus preventing the sprue 41 becoming clogged. Preferably, an addition of an ejector pin 26 is provided at the runner 42, the ejector pin 26 can cooperate with the ejector pin 24 and the puller pin 44 for ejecting the workpiece when finally formed and the material retained in the runner 42.

In operation, the adjusting member 15 is rotated using a tool passed through the opening 110 of the mold base 11. The adjusting member 15 together with the core member 13 rotates through an angle, and at the same time moves a certain distance along an axial direction of the threaded hole 142a, the core member 13 is thus moved relative to the core member 23, and thus adjusting a size of the mold chamber 30. Preferably, a graduated scale is provided for marking the movement distance of the adjusting member 15 or the core member 13. After that, the first mold part 10 and the second mold part 20 are brought together, and the workpiece is formed in the mold chamber 30 according to a certain molding process. When the workpiece is finally formed, the first mold part 10 and the second mold part 20 are pulled apart, the puller pin 44 pulls out the material retained in the sprue 41, the puller pin 44 and the ejector pins 24, 26 then cooperate to eject the workpiece and the material retained in the runner 42 and the cold slug well 43.

Alternatively, in operation, the first mold part 10 and the second mold part 20 can be brought together first, the adjusting member 15 can then be rotated using a tool passed through the opening 110 of the mold base 11, and subsequently the workpiece can then be formed in the mold chamber 30 according to a certain molding process.

It is understood that the mold 1 is not limited to form only one workpiece, the core holder 12 can define a number of the cavities 120 to receive a number of core members 13 with one adjusting member 15 each, and the core holder 22 can have a number of core members 23, thus the mold 1 can mold a number of workpieces at one time.

Figure 2:
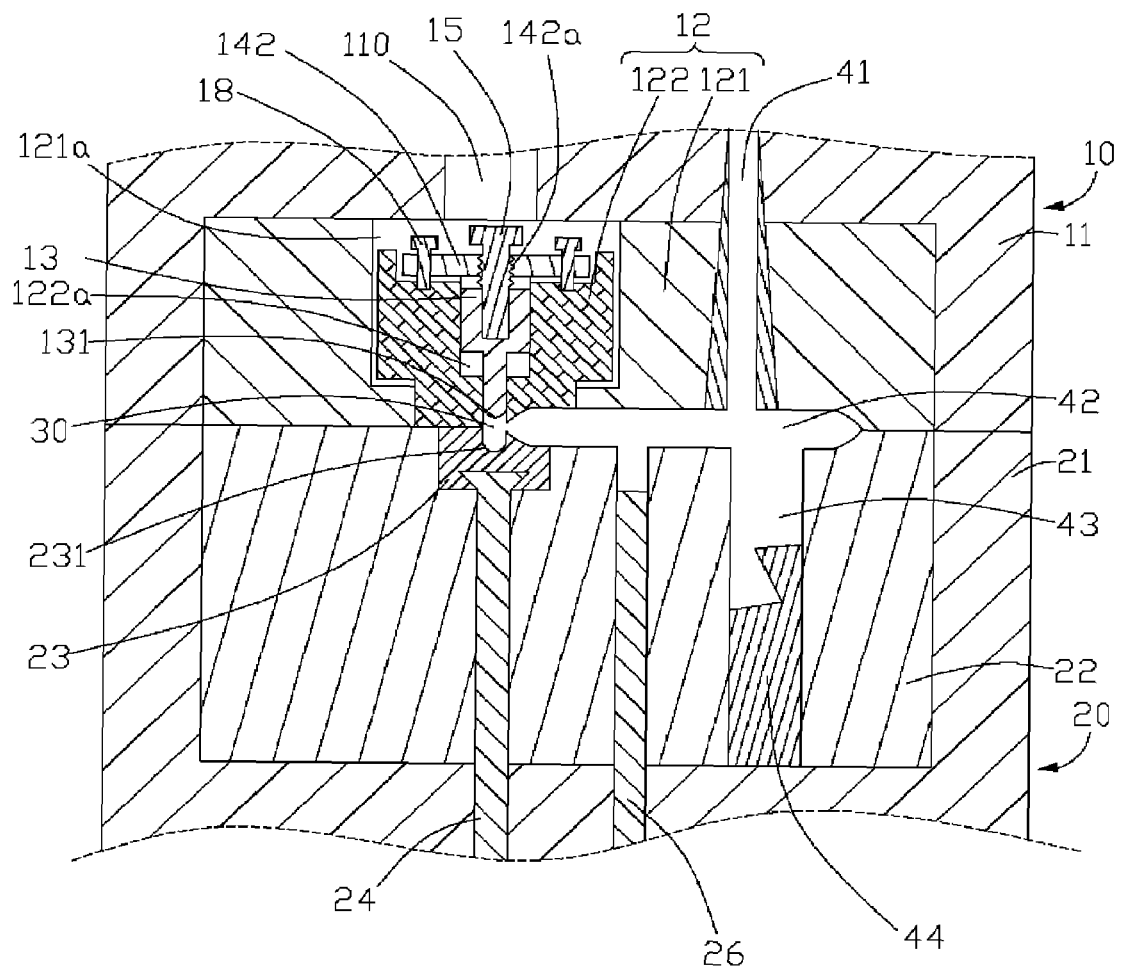
FIG. 2 is a schematic view of a mold for forming a workpiece according to a second preferred embodiment.

FIG. 2 shows an exemplary mold 2 according to a second preferred embodiment. The mold 2 is essentially similar to the mold 1 illustrated in the first preferred embodiment. However, the core holder 12 includes a first block 121 and second block 122. The first block 121 defines an opening 121a therein, the second block 122 defines a cavity 122a therethrough, and is received in the opening 121a. The core member 13 is received in the cavity 122a. The mounting member 14 consisting of the supporting plate portion 142 is secured to the second block 122. The adjusting member 15 is threadedly engaged with the supporting plate portion 142 and coupled to the core member 13.

Alternatively, the second block 122 can be integrated with the first block 121.

Furthermore, if the supporting plate portion 142 illustrated in the second preferred embodiment is integrated with the second block 122, it is resulted that the mounting member 14 illustrated in the first preferred embodiment is not needed in the present embodiment, especially when the core member 13 has a uniform shape, such as an elongated cylinder shape.

The above-described embodiment are intended to illustrate rather than limit the invention. Variations may be made to the embodiments and methods without departing from the spirit of the invention. Accordingly, it is appropriate that the appended claims be construed broadly and in a manner consistent with the scope of the invention.

What is claimed is:

1. A mold for forming a workpiece, comprising:
   a first core holder;
   a first core member mounted in the first core holder;
   a second core holder configured for attachment to the first core holder;
   a second core member mounted in the second core holder, the second core member being an ejector block coupled to an ejector pin, the first core member and the second core member being configured for cooperatively defining a mold chamber;
   a mounting member coupled to the first core holder;
   an adjusting member having a threaded portion in threaded engagement with the mounting member and a distal portion coupled to the first core member, the adjusting member being configured for adjustably moving the first core member relative to the second core member, thus adjusting a size of the mold chamber.

2. The mold as claimed in claim 1, wherein the first core member and the second core member both have a molding surface conforming to a surface of the workpiece.

3. The mold as claimed in claim 1, wherein the first core holder comprises a cavity defined therethrough, the first core member is received in the cavity, the mounting member comprises a holding plate portion defining a treaded hole therein, the threaded hole is configured for alignment with the cavity, the adjusting member is threadedly engaged in the threaded hole.

4. The mold as claimed in claim 1, wherein the first core member is an insert rotatably mounted in the first core holder.

5. The mold as claimed in claim 1, wherein the first core holder comprises a first block defining an opening therein, and a second block received in the opening, the second block comprises a cavity defined therethrough, the first core member is received in the cavity, the mounting member is secured to the second block and defines a threaded hole therein, the treaded hole is configured for alignment with the cavity, the adjusting member is threadedly engaged in the threaded hole.

6. The mold as claimed in claim 5, wherein the second block is integrated with the first block.

7. A mold for forming a workpiece, comprising:
   a first core holder;
   a first core member mounted in the first core holder;
   a second core holder configured for attachment to the first core holder;
   a second core member mounted in the second core holder, the second core member being an ejector block coupled to an ejector pin, the first core member and the second core member being configured for cooperatively defining a mold chamber;
   an adjusting member having a threaded portion in threaded engagement with the first core holder and a distal portion coupled to the first core member, the adjusting member being configured for adjustably moving the first core member relative to the second core member, thus adjusting a size of the mold chamber.

8. The mold as claimed in claim 7, wherein the first core holder comprises a cavity and a threaded hole being in alignment with the cavity, the first core member is received in the cavity, the adjusting member is threadedly engaged in the threaded hole.

9. The mold as claimed in claim 7, wherein the first core member is an insert rotatably mounted in the first core holder.

* * * * *